Figure 9:
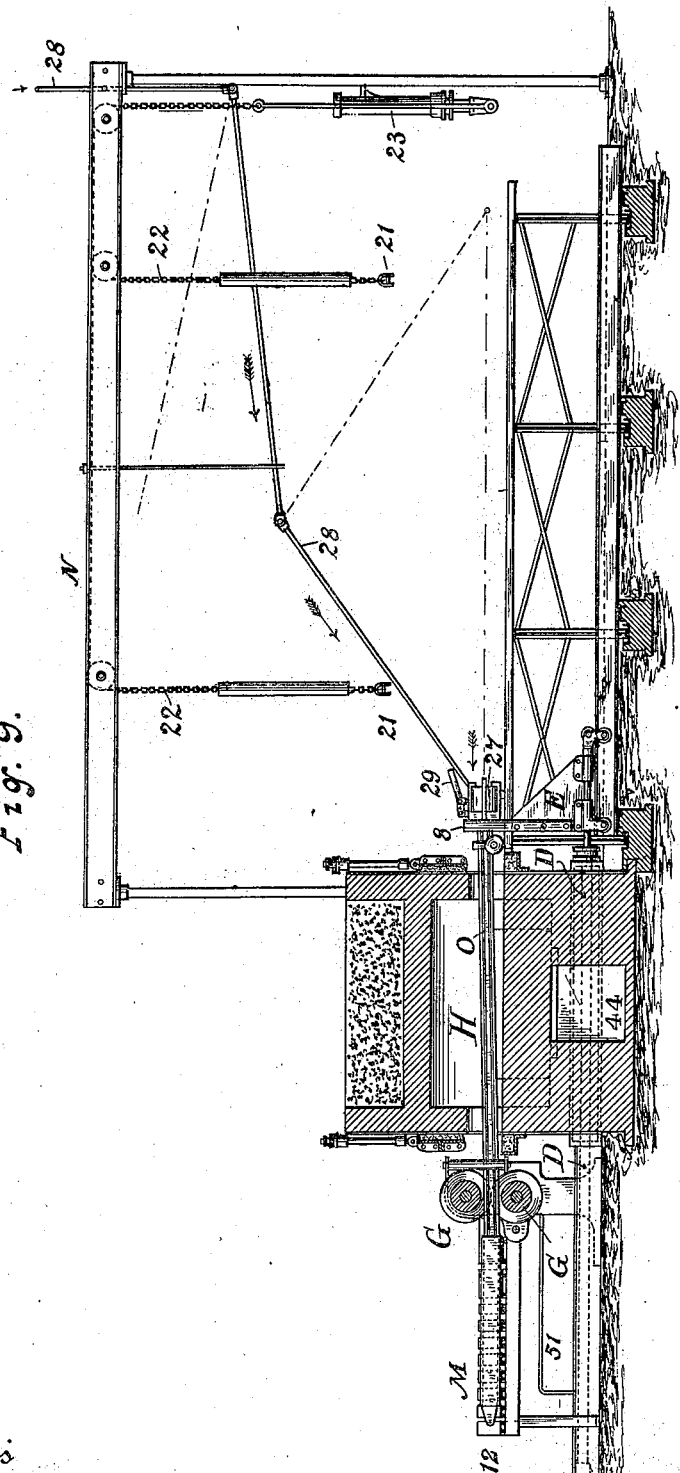

(No Model.) 4 Sheets—Sheet 1.
C. P. HIGGINS.
METAL WORKING APPARATUS.
No. 503,965. Patented Aug. 29, 1893.
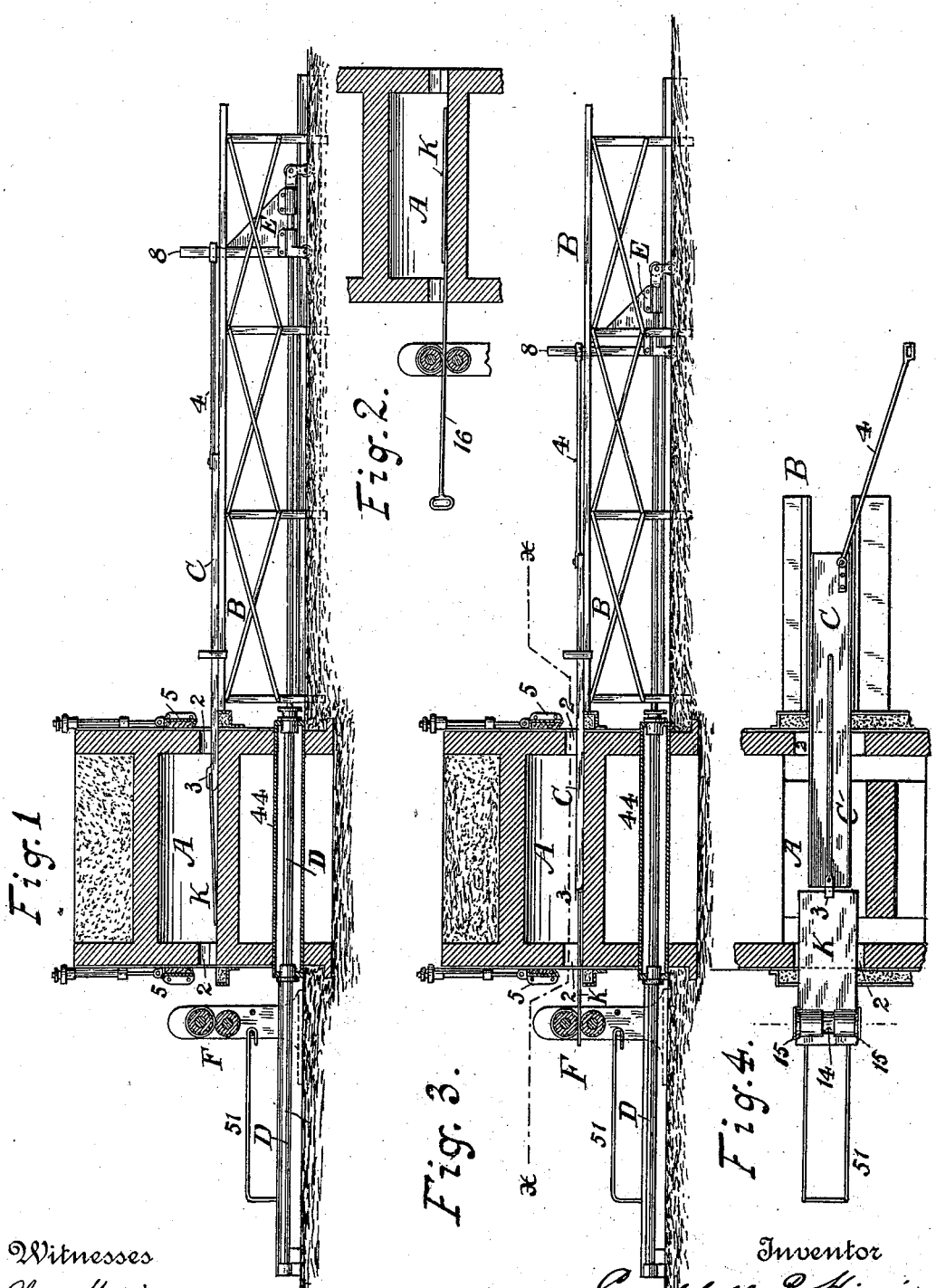
Witnesses
Chas. Hanimann
N. Marlin
Inventor
Campbell P. Higgins
By his Attorney
Chas. W. Forbes

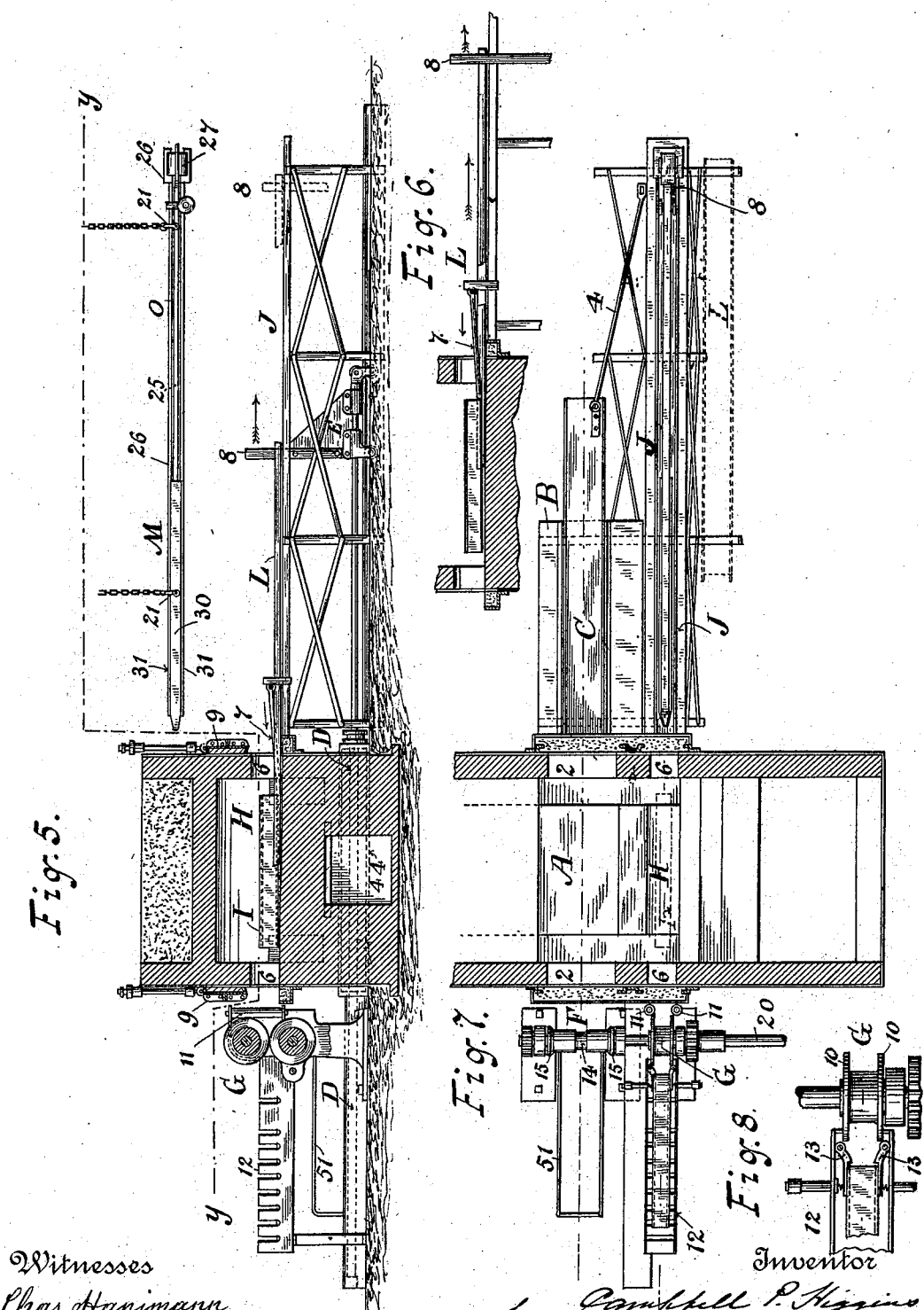
(No Model.) 4 Sheets—Sheet 2.
C. P. HIGGINS.
METAL WORKING APPARATUS.
No. 503,965. Patented Aug. 29, 1893.

(No Model.) 4 Sheets—Sheet 3.

C. P. HIGGINS.
METAL WORKING APPARATUS.

No. 503,965. Patented Aug. 29, 1893.

Witnesses
Chas Hanimann
N. Marler

Inventor
Campbell P. Higgins
By his Attorney
Chas W. Forbes (No Model.)　　　　　　C. P. HIGGINS.　　　　4 Sheets—Sheet 4.
METAL WORKING APPARATUS.
No. 503,965.　　　　　　　　　Patented Aug. 29, 1893.
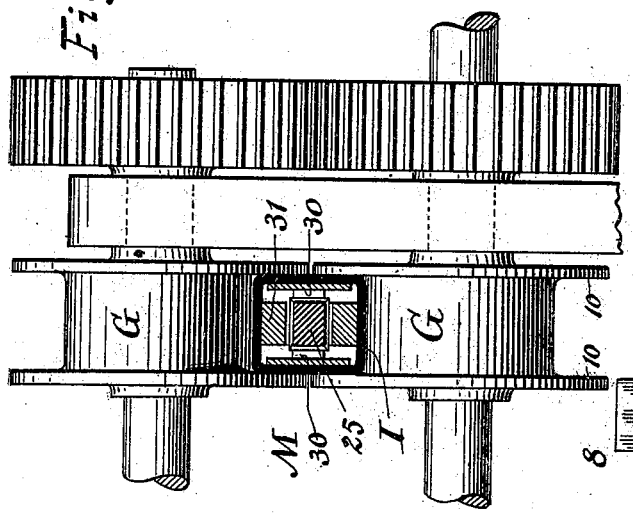
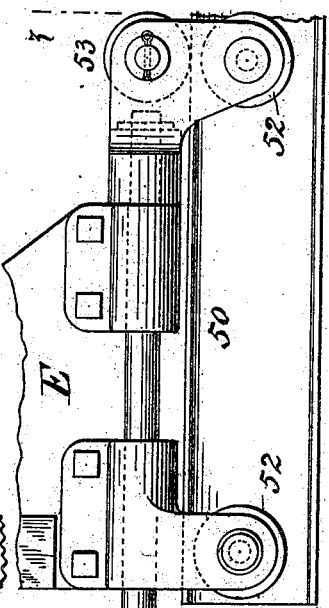
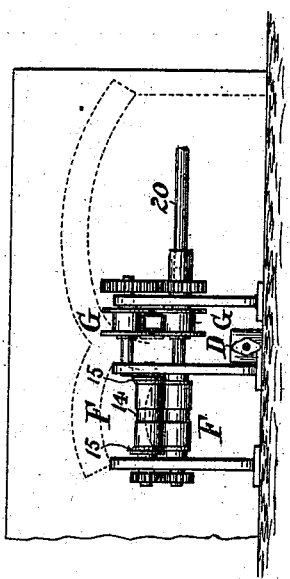
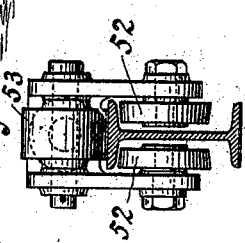
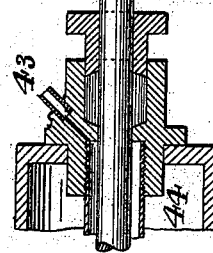
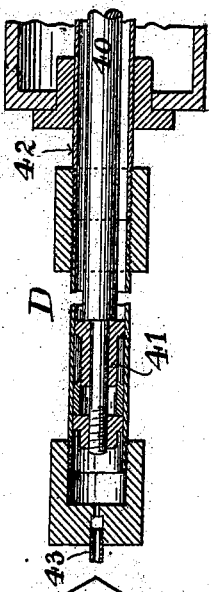
Witnesses
Chas. Hanimann
N. Marler
Inventor
Campbell P. Higgins
By his Attorney
Chas. W. Forbes

UNITED STATES PATENT OFFICE.

CAMPBELL P. HIGGINS, OF NEW YORK, N. Y.

METAL-WORKING APPARATUS.

SPECIFICATION forming part of Letters Patent No. 503,965, dated August 29, 1893.

Application filed July 5, 1892. Serial No. 439,065. (No model.)

*To all whom it may concern:*

Be it known that I, CAMPBELL P. HIGGINS, a citizen of the United States, residing in the city, county, and State of New York, have invented certain new and useful Improvements in Metal-Working Apparatus, of which the following is a specification.

The object of the invention is to provide an apparatus for heating and forging metal plates, namely, scarfing the edges of the plates and subsequently lay-welding the scarfed edges after the plate has been folded.

The apparatus is especially designed for use in the manufacture of headers for sectional steam boilers wherein the plates and headers are conveniently manipulated during the different processes to which they are subjected, and the objection and trouble of reheating are in a great degree avoided.

From the nature of the invention and in order that others may understand and use the same, I consider it best to refer to the respective details in connection with explanations of the operation and manipulation of the apparatus and subsequently to point out in the claims what I desire to secure by Letters Patent.

Referring to the accompanying drawings, in which like characters indicate like parts throughout, I illustrate a compound apparatus, one part of which is designed for scarfing the plates and the other part for welding the tubes; which may, however, be used independently and removed from one another.

Figure 1, represents a longitudinal sectional elevation of the scarfing furnace or furnace section, the automatic carrier on which the plates are first introduced, and the scarfing rolls; the position representing the deposit of the plate in the furnace. Fig. 2, is a similar partial sectional elevation; the position representing the insertion of the guiding or drawing rod. Fig. 3, is a longitudinal sectional elevation similar to Fig. 1; the position representing the delivery of the plate to the scarfing rolls. Fig. 4, is a horizontal section taken on the line x—x, of Fig. 3. Fig. 5, is a longitudinal sectional elevation showing the welding furnace or furnace section, the automatic conveying mechanism and mandrel, and the welding rolls; the position representing the deposit of the tube in the furnace. Fig. 6, is a similar partial sectional elevation; the position showing the carrier and the tube in section. Fig. 7, is a horizontal section taken on the line y—y, Fig. 5. Fig. 8, is an enlarged detail view, showing in plan, the stripping pawls adjacent to the welding rolls. Fig. 9, is a sectional elevation similar to Fig. 5, also illustrating the overhead frame for hoisting the mandrel; the advanced position of the mandrel being illustrated. Fig. 10, is an end elevation of Fig. 7, showing the compound furnace, and the scarfing and welding rolls. Fig. 11, is an enlarged detail view taken partly in section showing the hydraulic cylinder and carrier truck. Fig. 12, is a cross section of Fig. 11, taken on the line z—z, and Fig. 13, is an enlarged elevation of the welding rolls and their gearing.

In the scarfing process, Figs. 1, 2, 3 and 4, the edge of the plate K is first connected with a holder 3 of the carrier C in its retracted position outside the furnace A and advanced thereby into the furnace through a passage 2 by means of the hydraulic cylinder D, and conveying mechanism illustrated in enlarged detail Fig. 11, as follows: 40, is the piston rod, 41 the piston, 42 the cylinder, 43 the water supply to the respective opposite sides of the piston, connected to a suitable means of induction and eduction 44 a protecting jacket forming an annular space around the cylinder 42, and E a connected traveling truck with track way 50 and rollers 52—53 to which the carrier C is coupled by means of the rod 4. After the plate is deposited into the furnace as shown in Fig. 1, the carrier C and holder 3 are retracted, the doors 5, 5, closed and the plate subjected to the proper degree of heat. The doors 5, 5, are then opened and the carrier C and its holder 3 again advanced and moves the plate forward to the scarfing rolls as shown in Fig. 3, from which it is deposited upon the frame 51, the carrier being then returned to its first position. The scarfing rolls, as will be seen in Figs. 4, 7 and 10, are provided with central circumferential grooves 14, adapted for the insertion of the guiding or drawing rod 16 in the manner indicated in Fig. 2. The upper scarfing roll F, is further provided with beveled flanges 15, as indicated in the said figures. The plate K, with its edges beveled or scarfed, is then removed to a suitable press or other forming machine for folding the plate into a quadrangular tube having the scarfed edges lapped in suitable position for welding. The folded tube I, is then taken to the welding furnace H, as shown in Fig. 5, placed upon the table J, and deposited in the position shown by means of the carrier L, and brought to a welding heat.

The carrier L, is composed of a movable trough or plate which is temporarily placed on the table J, and connected by any suitable means to an arm 8, of the truck E, to be pushed into the furnace H, and withdrawn. When out of use, the carrier L, may be laid aside, as indicated by dotted lines in Fig. 7.

G, Figs. 5 to 9 inclusive, represents the welding rolls aligned with the passages 6, 6, and the table J. The rolls G, are provided with suitable flanges 10, 10, for confining and guiding the corners of the tube I, and there are vertical guide rolls 11, for guiding the tube into the welding rolls. The scarfing rolls F, and welding rolls G, are for convenience placed upon, or driven from, a common shaft 20.

H, in Figs. 5 to 9, inclusive, represents the furnace adapted to heat the folded tube I, preparatory to welding. Passages 6, 6, are provided to the furnace H, for the introduction and delivery of the tube I.

J, is the table from whence the tube I, is delivered to the furnace H, and L the tube carrier movable on the table J, and through the furnace H; said carrier being provided with a suitable pawl 7 for retaining the tube. The carrier L, is operated by the hydraulic cylinder D, which is shown in the drawings as common to both carriers C, and L, pertaining to the scarfing and welding rolls respectively. The truck E, carrying the extremity of the piston rod of the cylinder D, is also utilized in common, and there is a standard 8, thereon for pushing the mandrel when it is advanced into the tube in the furnace.

9, 9, are the furnace gates or doors adapted to open or close the passages 6, 6.

Above the table shown at Fig. 5, the mandrel M, is suspended, which after the carrier L has been removed to its position at the side of the table J, out of line with the furnace is lowered onto the table; and engaged with the arm 8, of truck E. The tube being brought to the welding heat, the doors 9, of the furnace are raised and pressure is again applied to the carrier E, by the cylinder D, so as to advance and force the mandrel M, into the heated tube which is lying in the furnace, carrying the same along, and passing it between the welding rolls G, where the seam in the tube is squeezed down on the mandrel with such force that the two edges are pressed together forming a welded rectangular tube. The mandrel M, in passing through the welding rolls with the tube, continues on its travel until the tube is deposited on the table 12, as shown in Fig. 9; wherein the finished tube is stripped from the mandrel. Within such table 12, there are provided stripping pawls 13, 13 at each side of the tube adapted to hold the same, which prevent its retraction when the mandrel is withdrawn.

The mandrel M, which is supported when not in operation, in a suitable overhead frame N, is indicated in Fig. 9; the suspended position of the same being indicated in Fig. 5.

The mandrel is provided with an elongated shank O, adapted to reach through the furnace H, when the mandrel is passed through the welding rolls G.

The links 21, 21, afford means of engaging the chains 22, with the mandrel, and there is a plunger cylinder 23, to which the chains 22, are rigged in a suitable manner to hoist or lower the mandrel upon the table J.

The mandrel M, is adapted to expand by the longitudinal movement of a central core 25, extended therein according to the construction which I have more fully described in a separate patent application filed simultaneously herewith, Serial No. 439,059, and at the extremity of the core 25, there is provided upon the frame 26, carrying the mandrel, a suitable hydraulic cylinder 27, for advancing or retracting the core 25. The cylinder 27, is supplied with water through a jointed or other flexible tubing 28, indicated in Fig. 9, at all positions of the mandrel, and there is a lever 29, for controlling the fluid pressure for expanding or contracting the mandrel. The cylinder 27, which withdraws the central core 25 of the mandrel, relaxes the sides and loosens the same in the tube. Pressure is then applied to the reverse side of the hydraulic cylinder D, which operates the carrier E, and the carrier and mandrel are forced back to their original position. The stripping pawls 13, retain the tube while the mandrel is thus withdrawn.

The welding rolls G, G, appear more fully in Fig. 13, which figure also illustrates the cross-section of the mandrel M, showing its core 25, expanding plates 30, and expanding faces 31, likewise designated in Fig. 5.

Having thus fully described my invention, what I claim, and desire to secure by Letters Patent, is—

1. In an apparatus for heating and forging metal, the combination of a suitable furnace having a throughway passage, forging rolls aligned with said passage upon one side of the furnace, an actuating plunger and cylinder provided with a fluid supply device and conveying mechanism for the work upon the other side of the furnace adapted to advance said work into and then through the furnace to the rolls; said mechanism consisting in a table, a truck connected to the said cylinder plunger, and interchangeable devices for supporting the work at the different stages of operation substantially as described.

2. In an apparatus for welding tubes, the welding rolls, a conveying mechanism for feeding the work to the rolls, a mandrel adapted to form a welding core for the tube, the same being provided with means for connecting it to the said conveying mechanism, and in the path of the conveying mechanism a suitable heating furnace substantially as described.

3. In an apparatus for heating and welding tubes, the welding rolls, a conveying mechanism, the through-way furnace interposed between the same and the rolls, a welding mandrel for the tube adapted for attachment to said conveying mechanism, and above the latter a suitable hoist and operating cylinder for placing and removing the mandrel thereon, substantially as described.

4. In a tube welding machine, the combination of a suitable welding furnace, welding rolls upon one side thereof, a conveying mechanism upon the other side, a fluid pressure cylinder for operating the conveying mechanism, an expansive mandrel for the tube and operating cylinder for the mandrel adapted for attachment to the said mechanism, and means for supplying pressure to the mandrel cylinder at all positions in the travel of the same, and above the conveying mechanism a suitable hoist for the mandrel and fluid pressure operating cylinder for the hoist.

5. In a machine for welding tubes, the combination with the welding rolls adapted for the passage of the mandrel, and the receiving trough 12, of stripping pawls substantially as described upon the delivery side of the rolls within said trough for the purpose set forth.

6. In an apparatus for heating and forging metal, a series of forging rolls, a plurality of furnaces or furnace sections provided with through-way passages aligned therewith, and conveying mechanism for the rolls provided to each said passage, and supporting devices for the work connected to an actuating plunger and cylinder provided with a fluid supply device whereby successive operations on different pieces of work are or may be simultaneously performed.

CAMPBELL P. HIGGINS.

Witnesses:
NAT. M. PRATT,
FRANCIS L. WARD.